United States Patent
Maag et al.

(10) Patent No.: US 6,472,026 B1
(45) Date of Patent: Oct. 29, 2002

(54) METHOD FOR MULTI-LAYERED COATING OF SUBSTRATES

(75) Inventors: Karin Maag, Inzlingen; Helmut Löffler, Brühl; Werner Lenhard, Wuppertal, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/555,181

(22) PCT Filed: Nov. 5, 1998

(86) PCT No.: PCT/EP98/07081

§ 371 (c)(1),
(2), (4) Date: Jun. 21, 2000

(87) PCT Pub. No.: WO99/26728

PCT Pub. Date: Jun. 3, 1999

(30) Foreign Application Priority Data

Nov. 20, 1997 (DE) .......................... 197 51 481
Dec. 20, 1997 (DE) .......................... 197 57 080

(51) Int. Cl.⁷ .................................. C08F 2/46
(52) U.S. Cl. ............... 427/492; 427/258; 427/287; 427/385.5; 427/386; 427/388.1; 427/393.5; 427/407.1; 427/407.3; 427/409; 427/410; 427/435; 427/443.2; 427/496; 427/500; 427/508; 427/510; 427/514; 427/551; 427/552; 427/553; 427/554; 427/555; 427/558; 427/559; 427/595; 427/596

(58) Field of Search .................. 427/492, 496, 427/500, 508, 510, 514, 551, 552, 553, 554, 555, 558, 559, 595, 596, 258, 287, 385.5, 386, 388.1, 393.5, 407.1, 407.3, 409, 410, 435, 443.2

(56) References Cited

U.S. PATENT DOCUMENTS

| 4,212,901 A | 7/1980 | van Neerbos et al. ..... 427/53.1 |
| 4,668,529 A | 5/1987 | Blair ......................... 427/54.1 |

FOREIGN PATENT DOCUMENTS

| CA | 2079498 | | 4/1993 |
| EP | 0 247 563 | | 12/1987 |
| GB | 2210291 A | * | 6/1989 |
| GB | 2262055 A | * | 6/1993 |

* cited by examiner

*Primary Examiner*—Bernard Pianalto
(74) *Attorney, Agent, or Firm*—Steven C. Benjamin

(57) ABSTRACT

Process for producing a multi-layer lacquer finish, in which a surfacer coating compound is applied to a substrate optionally pre-coated with a priming layer and/or further coating layers, and a top coating comprising a colour-imparting and/or special-effect-imparting base lacquer layer and a transparent clear lacquer layer, or a top coating comprising a pigmented one-layer top lacquer, is then applied, in which coating compounds which contain binders which are curable by free radical and/or cationic polymerisation are employed as the surfacer, the base lacquer and the clear lacquer as well as the one-layer top lacquer, and wherein the said binders are cured by means of high-energy radiation.

6 Claims, No Drawings

METHOD FOR MULTI-LAYERED COATING OF SUBSTRATES

The invention relates to a process for the multi-layer lacquering, in particular repair lacquering, of substrates, with a surfacer layer and a top lacquer layer, which in particular has uses in the automotive lacquering and automotive parts lacquering field.

Multi-layer automotive repair lacquer finishes generally consist of a surfacer layer applied to optionally pre-coated substrates and a top coating comprising a colour-imparting and/or special effect-imparting base lacquer layer and a transparent clear lacquer layer. However, it may also be a case of a top coating comprising a pigmented one-layer top lacquer.

Ecological considerations are behind a drive to reduce solvent emissions also from coating compounds in automotive repair lacquering. Thus, aqueous coating compounds or so-called high-solids coating compounds have already been developed for virtually all the lacquer layers. For example, two-component waterborne lacquers based on hydroxy-functional binders and polyisocyanate curing agents and on epoxy/polyamine systems are known for the surfacer and primer sector. On a number of points, however, coatings obtained with these lacquers still fail to match the properties of conventional solvent-based surfacers and primers. For example, the sandability of waterborne surfacers is still inadequate, and there are difficulties in achieving blister-free application at higher layer thicknesses.

In particular, reduction of the solvent content of base lacquers, especially in special-effect base lacquers which at approximately 80 wt. % have a high organic solvent content, makes an effective contribution towards the lowering of overall lacquering solvent emission. Waterborne base lacquers have already been developed for use in automotive repair lacquering. However, the coatings obtained with these waterborne base lacquers still fail to match the properties of conventional base lacquers on some points. For example, water resistance, hardness and inter-layer adhesion are still inadequate.

The same is also true of waterborne clear lacquers. For example, resistance to petrol and water still need improvement, as do hardness and appearance.

When waterborne lacquers are used a prolonged drying time must furthermore generally be accepted, thus compromising productivity, for example in a lacquering workshop.

It is already known to use coating compounds which are curable by means of high-energy radiation in automotive lacquering.

EP-A-540 884 describes a process for producing a multi-layer lacquer finish for automotive production line lacquering by the application of a clear lacquer layer to a dried and cured base lacquer layer, with the clear lacquer coating compound containing binders which are curable by free radical and/or cationic polymerisation, and with curing being carried out by means of high-energy radiation. Irradiation of the clear lacquer layer is followed by the stoving process, with the base lacquer and the clear lacquer being stoved together at, for example, from 80 to 160° C.

EP-A-247 563 describes UV-curable clear lacquers based on a poly(meth)acryloyl-functional compound, a polyol mono(meth)acrylate, a polyisocyanate, a light stabiliser and a photoinitiator. Here, some of the radiation-curable binders still contain hydroxy functions which are able to react with the available polyisocyanate, and afford additional curing potential.

EP-A-000 407 describes radiation-curable coating compounds based on an OH-functional polyester resin esterified with acrylic acid, a vinyl compound, a photoinitiator and a polyisocyanate. In a first curing step the irradiation curing is effected by means of UV light, and in a second curing step the coating obtains its final hardness as a result of OH/NCO cross-linking.

The second curing step can take place at from 130 to 200° C. or over a period of days at room temperature. The final hardness is achieved only after a number of days.

U.S. Pat. No. 4,668,529 thus describes a UV-curable one-component surfacer coating compound for repair lacquering. Tripropylene glycol triacrylate and trimethyl propane triacrylate are used as UV-curable binder components. It additionally contains an epoxy resin based on a bisphenol A-diglycidyl ether.

The object of the invention was to provide a process for producing a multi-layer lacquer finish, which enables environmentally acceptable coating compounds to be used in all the lacquer layers of a multi-layer structure, in order consequently to lower overall lacquering solvent emission to a minimum, and which simultaneously substantially shortens the total curing operation. The coatings obtained should have very good hardness, inter-layer adhesion and very good resistance to water, petrol and chemicals. Resistance to tree resin and pancreatine should furthermore be improved, and the lacquer finishes should achieve an impeccable optical appearance. The process should in particular be suitable for repair lacquering, for example of automotive bodies or parts thereof.

The object is achieved by a process for producing a multi-layer lacquer finish, in which a surfacer coating compound is applied to a substrate optionally pre-coated with a priming compound and/or further coating compounds, after which a top coating comprising a colour-imparting and/or special-effect-imparting base lacquer layer and a transparent clear lacquer layer, or a top coating comprising a pigmented one-layer top lacquer, are applied, characterised in that coating compounds which contain binders which are curable by free radical and/or cationic polymerisation are used as the surfacer, the base lacquer and the clear lacquer as well as the one-layer top lacquer, and wherein the said binders are cured by means of high-energy radiation.

The coating compounds for the individual lacquer layers may in each case additionally contain physically drying and further chemically cross-linking binders.

It was surprising and not deducible from the prior art that the multi-layer lacquer finishes obtained by the process according to the invention, in which each of the aforementioned lacquer layers is cured by means of high-energy radiation, show the same excellent properties demanded for repair lacquering, as have hitherto been obtained with the conventional highly regarded but solvent-based repair lacquers. This applies in particular to properties such as sandability, adhesion, hardness, resistance to water and chemicals, and appearance. Further properties were even able to be improved. Thus, the curing of the overall structure can be effected very rapidly, for example within the region of a few minutes. Problem-free application and rapid and complete full curing are possible even at high layer thicknesses and high pigmentation levels. It was further surprisingly found that resistance to petrol, tree resin and pancreatine can also be improved with the multi-layer lacquer finish according to the invention, by comparison with a solvent-based multi-layer structure.

The surfacer, base lacquer, clear lacquer and one-layer top lacquer coating compounds which are usable in the process according to the invention are constituted by coating compounds which cross-link by means of high-energy radiation by way of free radical and/or cationic polymerisation. They may here be aqueous, solvent-based or 100% coating compounds which can be applied without solvent and without water. High-solids water-based or solvent-based coating compounds are preferably formulated. The coating compounds then contain only small quantities of organic solvents.

In the process according to the invention, in all the named coating compounds any conventional radiation-curable binders or mixtures thereof, which are known to those skilled in the art and are described in the literature may be used as binders which are curable by means of high-energy radiation. These are binders which are cross-linkable either by free radical or cationic polymerisation. In the case of the former, as a result of the high-energy radiation acting on the photoinitiators, radicals arise which then trigger the cross-linking reaction. In the cationic-curing systems irradiation causes Lewis acids to be formed from initiators, which in turn then trigger the cross-linking reaction.

The free radical-curing binders may be constituted, for example, by prepolymers such as polymers or oligomers having in the molecule olefinic double bonds which are polymerisable by free radical initiation. Examples of prepolymers and oligomers are (meth)acrylic-functional (meth)acrylic copolymers, epoxy resin (meth)acrylates, for example aromatic epoxy resin (meth)acrylates, polyester (meth)acrylates, polyether (meth)acrylates, polyurethane (meth)acrylates, for example aliphatic polyurethane (meth)acrylates, amino (meth)acrylates, silicone (meth)acrylates, melamine (meth)acrylates, unsaturated polyurethanes or unsaturated polyesters. The number average molar mass (Mn) of these compounds is preferably around 200 to 10 000. The molecule preferably contains on average 2 to 20 olefinic double bonds which are polymerisable by free radical initiation. The binders may be used singly or in mixture.

The term "(meth)acryl" stands for acryl and/or methacryl.

The prepolymers may be present in combination with reactive diluents, that is to say reactive polymerisable liquid monomers. The reactive diluents are generally used in quantities of from 1 to 50 wt. %, preferably 5 to 30 wt. %, with reference to the total weight of prepolymer and reactive diluent. The reactive diluents may be monounsaturated, diunsaturated or polyunsaturated. Examples of monounsaturated reactive diluents are: (meth)acrylic acid and esters thereof, maleic acid and semiesters therefor, vinyl acetate, vinyl ethers, substituted vinyl ureas, styrene, vinyl toluene. Examples of diunsaturated reactive diluents are: di(meth)acrylates such as alkylene glycol di(meth)acrylate, polyethylene glycol di(meth)acrylate, 1,3-butanediol di(meth)acrylate, vinyl (meth)acrylate, allyl (meth)acrylate, divinyl benzene, dipropylene glycol di(meth)acrylate, hexanediol di(meth)acrylate. Examples of polyunsaturated reactive diluents are: glycerol tri(meth)acrylate, trimethylolpropane tri(meth)acrylate, pentaerythritol tri(meth)acrylate, pentaerythritol tetra(meth)acrylate. The reactive diluents may be used singly or in mixture. Diacrylates such as, for example, dipropylene glycol diacrylate, tripropylene glycol diacrylate and/or hexanediol diacrylate are preferably used as reactive diluents.

The conventional binders known to those skilled in the art and described in the literature may be used as binders for cationically polymerisable systems. In this case, for example, they may be polyfunctional epoxy oligomers containing more than two epoxy groups in the molecule. These are, for example, polyalkylene glycol diglycidyl ethers, hydrogenated bisphenol A-glycidyl ethers, epoxy urethane resins, glycerol triglycidyl ethers, diglycidylhexahydrophthalate, diglycidyl esters of dimeric acids, epoxidised derivatives of (methyl)cyclohexene such as, for example, 3,4-epoxycyclohexylmethyl(3,4-epoxycyclohexane) carboxylate or epoxidised polybutadiene. The number average molar mass of the polyepoxide compounds is preferably less than 10 000. Reactive diluents such as, for example, cyclohexene oxide, butene oxide, butanediol diglycidyl ether or hexanediol diglycidyl ether, may also be used.

Various free radical-curing systems, various cationically-curing systems or free radical and cationically-curing systems may be combined with one another to prepare the surfacer, base lacquer, clear lacquer and one-layer top lacquer coating compounds which are curable by means of high-energy radiation. Free radical-curing systems are preferably used. According to a preferred embodiment, the same binders are used in each case for the surfacer, base lacquer and clear lacquer layers, or for the surfacer and top lacquer layers. Binders which are curable by free radical initiation by means of high-energy radiation, which are preferably usable for the preparation of surfacers are epoxy (meth)acrylates, polyurethane (meth)acrylates and polyester (meth)acrylates. Aromatic epoxy (meth)acrylates are particularly preferred. The binders named are generally obtainable as commercial products. Binders which are curable by free radical initiation by means of high-energy radiation, which are preferably usable for the preparation of base lacquers, clear lacquers and one-layer lacquers are polyurethane (meth)acrylates, polyester (meth)acrylates and acrylic-functional poly(meth)acrylates. Aliphatic polyurethane (meth)acrylates and/or acrylic-functional poly(meth)acrylates are particularly preferred. The binders named are generally obtainable as commercial products. In the process according to the invention for multi-layer lacquering the following layer structure is preferably employed: surfacer coating compound based on epoxy (meth)acrylates, particularly preferably based on aromatic epoxy (meth)acrylates; as the top lacquer layer either a layer comprising base lacquer and clear lacquer or comprising pigmented one-layer top lacquer, with in each case the coating compounds being based on polyurethane (meth)acrylates, polyester (meth)acrylates and/or acrylic-functional poly(meth)acrylates, particularly preferably aliphatic polyurethane (meth)acrylates and/or aliphatic (meth)acrylate-functional poly(meth)acrylates. The binder systems which cure when acted upon by radiation contain photoinitiators. Suitable photoinitiators are, for example, those which absorb within the wavelength range of 190 to 600 nm. Examples of photoinitiators for free radical-curing systems are benzoin and benzoin derivatives, acetophenone, and acetophenone derivatives such as, for example, 2,2-diacetoxyacetophenone, benzophenone and benzophenone derivatives, thioxanthone and thioxanthone derivatives, anthraquinone, 1-benzoylcyclohexanol, organo-phosphorus compounds such as, for example, acyl phosphine oxides. The photoinitiators are used in quantities of, for example, from 0.1 to 7 wt. %, preferably 0.5 to 5 wt. %, with reference to the sum of prepolymers polymerisable by free radical initiation, reactive diluents and photoinitiators. The photoinitiators may be used singly or in combination. Further synergistic components, for example tertiary amines, may furthermore be used. Photoinitiators for cationically-curing systems are substances which are known as onium salts, which release Lewis acids by photolysis when acted upon by radiation. Examples of these are diazonium salts, sulfonium salts or iodonium salts. Triarylsulfonium salts are preferred. The photoinitiators for cationically-curing systems may be used singly or as mixtures, in quantities of from 0.5 to 5 wt. %, with reference to the sum of cationically polymerisable prepolymers, reactive diluents and initiators. The surface, base lacquer, clear lacquer and one-layer top lacquer coating compounds which are usable in the process according to the invention for multi-layer lacquering may contain binders which are curable exclusively by means of high-energy radiation. However, they may also contain, in addition to the binders which are curable by means of high-energy radiation, physically drying and/or further chemically cross-linking binders. The additionally usable binders may be solvent-based or water-based. Any conventional binder systems known to those skilled in the art, such as are used in automotive or automotive repair lacquering for the coating compounds in each case, are considered to be additionally usable binders. Examples of physically drying binders are epoxy resins, acrylic resins, polyurethane resins, polyurethane urea resins, polyester urethane resins and polyester resins as well as modifications of these resins such as, for example, acrylised and/or silicon-modified polyurethane resins or polyester resins or so-called Schoss-type polymers, that is to say (meth)acrylic copolymers prepared in the presence of, for example, polyester resins and/or polyurethane resins. Examples of chemically cross-linking binders are two-component binder systems based on isocyanate-functional and hydroxy-functional and/or amine-functional components, of hydroxy-functional and anhydride components, of polyamine components and epoxy components or of polyamine components and acryloyl-functional components. The binder systems named by way of example are known to those skilled in the art and are described in detail in the literature. The coating compounds which are usable in the process according to the invention may contain additional components such as are conventional for lacquer formulation. They may contain, for example, additives which are conventional in lacquers. The additives are conventional additives which are usable in the lacquer sector. Examples of such additives are levelling agents, for example based on (meth)acrylic homopolymers or silicone oils, anti-cratering agents, antifoams, catalysts, adhesion promoters, rheological additives, thickeners, light stabilisers. The additives are used in conventional quantities well-known to those skilled in the art.

The coating compounds which are usable in the process according to the invention may contain small quantities of organic solvent and/or water. The solvents are conventional solvents used in lacquer technology. These may originate in the preparation of the binders, or are added separately. Examples of such solvents are monohydric or polyhydric alcohols, for example propanol, butanol, hexanol; glycol ethers or glycol esters, for example diethylene glycol dialkyl ether, dipropylene glycol dialkyl ether, in each case having $C_1$–$C_6$-alkyl, ethoxy propanol, butyl glycol; glycols, for example ethylene glycol, propylene glycol and oligomers thereof, esters such as, for example, butyl acetate and amyl acetate, alkylated pyrrolidones, for example N-methylpyrrolidone as well as ketones, for example methyl ethyl ketone, acetone, cyclohexanone; aromatic or aliphatic hydrocarbons, for example toluene, xylene or linear or branched-chain aliphatic $C_6$–$C_{12}$ hydrocarbons.

Surfacer coating compounds which are usable in the process according to the invention may contain extenders and pigments. These are the conventional extenders which are usable in the lacquer industry and organic or inorganic colour-imparting and/or anti-corrosion pigments. Examples of pigments are titanium dioxide, micronised titanium dioxide, iron oxide pigments, carbon black, azo pigments, zinc phosphate. Examples of extenders are silicon dioxide, aluminium silicate, barium sulphate and talcum.

The top coating which is usable in the process according to the invention may be constituted by a two-layer lacquer finish comprising base lacquer/clear lacquer lacquering or by a pigmented lacquer finish comprising a one-layer top lacquer.

Base lacquers or one-layer top lacquers which are usable in the process according to the invention may contain colour-imparting and/or special-effect-imparting pigments and optionally extenders. Any pigments of an organic or inorganic nature which are conventional in lacquers are suitable as colour-imparting pigments. Examples of inorganic or organic coloured pigments are titanium dioxide, micronised titanium dioxide, iron oxide pigments, carbon black, azo pigments, phthalocyanine pigments, quinacridone and pyrrolopyrrole pigments. The special-effect pigments are distinguished in particular by a platelet-like structure. Examples of special-effect pigments are: metal pigments, for example of aluminium, copper or other metals; interference pigments such as, for example, metal oxide-coated metal pigments, for example titanium dioxide-coated or mixed oxide-coated aluminium, coated mica, such as, for example titanium dioxide-coated mica and graphite special-effect pigments. UV-curing pigments and optionally extenders which are coated with UV-curable compounds, for example acrylic-functional silanes, and are included in the radiation curing process may also be used advantageously here.

In order to increase scratch resistance, special coated transparent extenders may also be contained advantageously in the clear lacquers which are usable in the process according to the invention, in addition to the additives which are conventional for a clear lacquer. Here, micronised aluminium oxide or micronised silicon oxides, for example, are considered as extenders. These transparent extenders are coated with compounds which contain UV-curable groups, for example having acrylic-functional silanes, and are consequently included in the radiation curing of the clear lacquer. The extenders are obtainable as commercial products, for example under the name AKTISIL®.

The multi-layer lacquer finish is applied in the process according to the invention to optionally pre-coated substrates. Preferred substrates are substrates of metal or plastics material. The substrates may be coated with conventional priming layers or further intermediate layers such as are employed for multi-layer lacquering in the automotive sector. In the process according to the invention the individual lacquer layers are applied by conventional processes, preferably by spray application.

The surfacer coating compounds are in particular applied to an automotive body or parts thereof already pre-coated or pre-treated as part of automotive repair lacquering, however they may also be applied to old lacquer finishes. They may, for example, be applied to conventional solvent-based or water-based fillers, primers, adhesion primers or further intermediate layers such as are conventional for automotive repair lacquering, or to old lacquer finishes such as, for example electrophoretic bases. The bases or lacquer layers to which the surfacer layer is applied may in this case be already hardened or pre-dried. The fillers or primers already applied as part of repair lacquering are constituted, for example, by such surfacers or primers as are based on peroxide-curing unsaturated polyesters, acid-curing polyvinyl butyrals, physically drying binders, for example polyurethanes or acrylates, as well as two-component binders based on epoxy/polyamine or hydroxy component/ polyisocyanate.

After the application of the surfacer to one of the aforementioned bases the surfacer layer, optionally after a short flash-off phase, is exposed to high-energy radiation, preferably UV radiation. UV radiation sources which emit in the wavelength range 180 to 420 nm, in particular 200 to 400 nm, are preferred. Examples of such UV radiation sources are optionally doped high-pressure, medium-pressure and low-pressure mercury vapour radiators, gas discharge tubes such as, for example, low-pressure xenon lamps, pulsed and unpulsed UV lasers, UV spot radiators such as, for example, UV-emitting diodes and black light tubes. Irradiation is preferably with pulsed UV radiation. So-called high-energy electron flash devices (abbreviated to UV flash lamps) are then particularly preferably used as the radiation source. Preferred UV flash lamps emit light of a wavelength of from 200 to 900 nm with a maximum at approximately 300 to 500 nm. The UV flash lamps preferably contain a plurality of flash tubes, for example quartz tubes filled with an inert gas such as xenon. The UV flash lamps should deliver at the surface of the coating to be cured an illuminance of at least 10 megalux, preferably 10 to 80 megalux, per flash discharge. The energy per flash discharge should preferably be from 1 to 10 kJoule. The UV flash lamps are preferably transportable devices able to be positioned directly facing a damaged area for repair. Depending on the circumstances, one or more UV flash lamps may be used. UV flash lamps which are usable are described in WO-A-9411123 and EP-A-525 340, for example. UV flash lamps are commercially obtainable.

The surfacer layer may then be dried and cured by a plurality of successive flash discharges. From 1 to 40 successive flash discharges are preferably released. Here, the distance of the UV flash lamp from the substrate surface to be irradiated may be from 5 to 50 cm, preferably 10 to 25 cm, particularly preferably 15 to 20 cm. The UV lamps may here be screened to prevent radiation leakage by, for example, employing an appropriately lined protective housing around the transportable lamp unit or with the aid of other safety measures known to those skilled in the art.

The total duration of irradiation is in the region of a few seconds, for example within the range 3 milliseconds to 400 seconds, preferably 4 to 160 seconds, depending on the number of flash discharges selected. The flashes may be released approximately every 4 seconds, for example. The UV flash lamps are always ready for use immediately, that is to say they require no warm-up time and can remain switched off between two curing or irradiation operations separated by a time interval, without the need to accept downtime on the resumed irradiation operation on account of the warm-up phase.

A particular advantage of the process according to the invention lies in the ability of the surfacer to be applied in one working operation (without intermediate sanding) at high layer thicknesses of, for example, from 300 to 400 $\mu$m with rapid full curing of the coatings, rendering them fully sandable after a very short time. Even with very high pigmentation, for example at a pigment volume concentration (p.v.c.) of approximately 45%, and a high layer thickness, complete and rapid full curing may be achieved by applying the surfacer coating compound in a plurality of spray passes, preferably two, and effecting an intermediate irradiation after the first spray pass or after the further spray passes, if a total of more than two spray passes are effected. Thus, for example, from 100 to 200 $\mu$m are applied in a first spray pass, intermediate curing is effected with, for example, from 2 to 5 flashes, a further layer of, for example, from 100 to 200 $\mu$m is then applied in a second spray pass, and the complete curing is effected with the necessary number of flash discharges.

If in addition to the radiation-curable binders further binders are also contained in the surfacer coating compounds which are usable according to the invention, the temperatures generated on the coating by the flash lamp by means of the UV irradiation are generally sufficient to cure the additionally employed binders. No separate curing operation is necessary.

The top coating comprising a colour-imparting and/or special-effect-imparting base lacquer layer and a transparent clear lacquer layer, which is curable by means of high-energy radiation, or a top coating comprising a pigmented one-layer top lacquer, is applied after partial or complete curing of the surfacer layer or wet-on-wet to the surfacer layer in the process according to the invention.

If a two-layer base lacquer/clear lacquer top coating is employed, the base lacquer layer is applied first. Here, the base lacquer may be applied to the completely hardened surfacer layer, followed by the separate curing of the base lacquer layer by UV radiation. From 15 to 30 flash discharges, for example, suffice to cure completely a resulting dry film layer thickness of the base lacquer layer of approximately 50 to 70 $\mu$m.

It is also possible, but is less preferred, to apply the base lacquer wet-on-wet to the surfacer layer and to expose the surfacer and base lacquer layers together to the UV radiation in one working step. The surfacer layer may optionally undergo brief intermediate irradiation.

In the next step of the process according to the invention the clear lacquer layer curable by means of high-energy radiation is applied. The clear lacquer may be applied to the base lacquer, for example wet-on-wet, optionally after a short flash-off phase at room temperature. Irradiation follows, with the base lacquer and the clear lacquer being irradiated or cured together in one working step. The clear lacquer may, however, also be applied to the base lacquer which has been hardened completely by radiation, and is then exposed to the UV radiation in a separate curing step.

If a top coating comprising a one-layer top lacquer which is curable by means of high-energy radiation is employed, it may be applied to the completely hardened surfacer layer and hardened in a separate irradiation operation. It is, however, also possible to apply the one-layer top lacquer wet-on-wet to the surfacer layer, optionally after a short flash-off phase or a brief intermediate irradiation of the surfacer layer, and then to expose both lacquer layers together to irradiation.

As can be seen from the embodiments hereinabove, the process according to the invention may be carried out in different ways. One embodiment of the process according to the invention comprises applying the individual lacquer layers in each case wet-on-wet, optionally after a short flash-off phase, and curing the total multi-layer lacquer finish with a single final irradiation operation. In this case, a correspondingly high number of flash discharges must then be selected in order to enable the surfacer layer also to achieve adequate full curing.

A second variant comprises exposing each lacquer layer of the multi-layer structure in each case separately to complete curing. A third variant comprises curing in each case two successive lacquer layers with a single common irradiation operation, and curing the underlying or overlying lacquer layer with a separate irradiation operation. A fourth variant comprises effecting intermediate curing of in each case one or two successive lacquer layers, followed by undertaking the complete curing of the total structure. The intermediate or final curing may in each case be effected at a different radiation intensity and different irradiation time as well as a different number of flash discharges.

Multi-layer coatings affording great hardness, scratch resistance and very good resistance to water, chemicals and petrol, and with excellent appearance are obtained in a very short time with the process according to the invention. The individual lacquer layers show very good inter-layer adhesion and very good resistance to partial dissolution vis-á-vis underlying and overlying lacquer layers. The latter properties are particularly pronounced when like radiation-curable binders are employed, that is to say like prepolymers/oligomers and/or like reactive diluents in the different lacquer layers, where this is appropriate and possible, for example in the base lacquer and the clear lacquer. In other respects the coatings meet the requirements of a repair lacquer structure in the automotive lacquering field. The coatings are dried and cured in a decisively shorter time than water-based and/or solvent-based repair lacquer structures which are dried and cured in conventional manner. It is, for example, possible to complete the entire drying and curing process within approximately 10 to 30 minutes, preferably 10 to 20 minutes.

Even in comparison with a conventional solvent-based repair lacquer structure, which per se already has excellent properties, advantages are obtained with the process according to the invention. Thus, for example, very thick surfacer layers may be applied and cured in a single working operation (without intermediate sanding), and even with highly pigmented surfacers (for example at a pigment/volume concentration (p.v.c.) of from 30 to 45% or more) at a high layer thickness, complete rapid full curing and good sandability are possible after a short drying time. Surfacer layers are, for example, possible at a thickness of from 200 to 400 $\mu$m, preferably 300 to 400 $\mu$m. The multi-layer structure according to the invention furthermore shows advantages as regards resistance to fuel, tree resin and pancreatine.

A further advantage is that, in cases in which technological or economic reasons dictate or suggest dispensing with a clear lacquer in the multi-layer structure, for example when lacquering automotive interior areas such as the engine compartment, luggage compartment, or door rebates, or when lacquering textured surfaces of plastics material, the clear lacquer may be omitted without difficulty. The base lacquer cured by means of high-energy radiation fulfils the function of the clear lacquer, for example regarding hardness and scratch resistance, without trouble and without any modification.

The process according to the invention may, for example, be used advantageously in automotive repair lacquering, in particular for repair lacquering of automotive parts, smallish damaged areas and spot repairs.

The invention is explained by reference to the following Example.

EXAMPLE

Producing a Multi-layer Lacquer Finish

A multi-layer lacquer finish is produced from the surfacer, base lacquer and clear lacquer coating compounds described hereinbelow.

1. Preparation of a Surfacer

The following components were mixed together and dispersed for a few minutes in a high-speed stirrer (all quantities indicated are by weight):

131 parts commercial aromatic epoxy acrylate 56 parts hexanediol diacrylate 9 parts commercial adhesion promoter 127 parts commercial barytes 126 parts commercial kaolin 6.1 parts of a mixture of commercial photoinitiators (derivatives of arylphosphine oxide and of acetophenone)

113 parts butyl acetate

2. Preparation of a Base Lacquer

The following components were mixed together and dispersed for a few minutes in a high-speed stirrer (all quantities indicated are by weight):

476 parts commercial aliphatic polyurethane acrylate 13 parts commercial levelling agent 223 parts titanium dioxide 25 parts of a mixture of commercial photoinitiators (derivatives of arylphosphine oxide and of acetophenone)

110 parts butyl acetate

3. Preparation of a Clear Lacquer

The following components were mixed together and homogenised for a few minutes in a high-speed stirrer (all quantities indicated are by weight):

114 parts commercial aliphatic polyurethane acrylate 0.3 parts commercial levelling agent 7.2 parts of a mixture of commercial photoinitiators (derivatives of arylphosphine oxide and of acetophenone)

44 parts butyl acetate 1 part commercial light stabiliser (hindered amine type)

1 part commercial UV absorber (benzotriazole type)

Producing a Multi-layer Structure

The surfacer prepared as described hereinabove is applied to electrophoretically coated metal sheets. For this purpose a surfacer layer is first applied in one working operation to a resulting dry film layer thickness of approx. 300 $\mu$m, and after a short flash-off phase at room temperature the surfacer layer is exposed to irradiation by a UV flash lamp (3500 Ws). It is irradiated with 30 flashes (approx. 120 s). The surfacer is then sanded, and the base lacquer prepared as described hereinabove is over-lacquered to a resulting dry film layer thickness of approximately 60 $\mu$m. After a short flash-off time at room temperature the base lacquer layer is exposed to irradiation by a UV flash lamp (3500 Ws). It is irradiated with 20 flashes (approx. 80 s).

The clear lacquer prepared as described hereinabove is then applied to a resulting dry film layer thickness of 60 $\mu$m. After a short flash-off time at room temperature the clear lacquer layer is exposed to irradiation by a UV flash lamp (3500 Ws). It is irradiated with 20 flashes (approx. 80 s).

The results of testing the lacquer finish appear below:

| Property | Multi-layer structure according to the invention | Comparison multi-layer structure (1) |
| --- | --- | --- |
| Resistance (2) to: | | |
| Fuel | 0 | 3–4 |
| Tree resin | 0–1 | 2 |
| Pancreatine | 3 | 4 |

-continued

| Property | Multi-layer structure according to the invention | Comparison multi-layer structure (1) |
|---|---|---|
| HCl | 0 | 0 |
| $H_2SO_4$, 10% | 0 | 0 |
| NaOH | 0 | 0 |
| Appearance | O.K. | O.K. |
| Damp/warm test (3) (4) | 0/0 | |
| Adhesion (5) | 0–1 | |
| Adhesion (5) after Damp/warm test (3) | 0–1 | |

(1) For comparison purposes a conventional solvent-based repair lacquer structure comprising two-component polyurethane surfacer, conventional CAB-containing base lacquer and two-component clear lacquer was used.
(2) VDA (German automotive industry association) test corresponding to VDA Test Standard 621/612
(3) Damp/warm test in accordance with DIN 50017
(4) Evaluation of blistering in accordance with DIN 53209
(5) Cross-hatch adhesion test based on DIN 53151

The results show that in some properties the multi-layer structure according to the invention matches the excellent properties of a conventional solvent-based repair lacquer structure, and in other properties it is even markedly superior.

What is claimed is:

1. A process for forming a multi-layer finish having an automotive quality appearance on a substrate selected from the group consisting of automotive bodies and automotive parts comprising the steps of:
   1) applying a layer of surfacer coating compound containing a binder to the substrate;
   2) applying a base lacquer coating layer containing a binder over the surfacer coating compound layer wherein the base lacquer coating layer comprises a color-imparting layer;
   3) applying a clear lacquer coating layer containing a binder over the base lacquer layer; and
   4) curing the layers with high energy radiation to form a finish having an automotive quality appearance; wherein the binders of the surfacer coating compound, the base lacquer coating and the clear lacquer coating, are each curable with high energy radiation and are individually selected from the group consisting of a binder curable exclusively by free radical polymerization, a binder curable exclusively by cationic polymerization, and a mixture of binders, one curable by free radical polymerization and a second curable by cationic polymerization.

2. The process of claim 1, wherein the high energy radiation used to cure the layers is pulsed UV radiation.

3. The process of claim 1 wherein the binders of the surfacer coating compound, the base lacquer coating and the clear coating are curable by free radical polymerization and are individually selected from the group consisting of aromatic epoxy resin (meth)acrylates, aliphatic polyurethane (meth)acrylates, and (meth)acrylic functional (meth)acrylic copolymers.

4. The process of claim 1 in which the substrate is coated with a primer layer.

5. The process of claim 1 used in the repair of multi-layer lacquer coated automotive bodies or parts thereof.

6. The process of claim 1 in which at least one of the binders of the surfacer coating compound, the base lacquer coating and the clear lacquer coating comprises in addition a binder selected from the group consisting of a binder that is a chemically crosslinkable binder and a binder that on physical drying forms a film.

* * * * *